(12) United States Patent
Schmid et al.

(10) Patent No.: US 7,737,686 B2
(45) Date of Patent: Jun. 15, 2010

(54) DISTANCE SENSOR ARRANGEMENT FOR A MAGNET OF THE LEVITATION MAGNET OF A MAGNETIC LEVITATION TRANSPORT SYSTEM

(75) Inventors: Robert Schmid, Neunkirchen am Brand (DE); Benno Weis, Hemhofen (DE)

(73) Assignee: Siemens AG, Munich (DE)

( * ) Notice: Subject to any disclaimer, the term of this patent is extended or adjusted under 35 U.S.C. 154(b) by 272 days.

(21) Appl. No.: 11/814,979

(22) PCT Filed: Jan. 11, 2006

(86) PCT No.: PCT/EP2006/050149
§ 371 (c)(1),
(2), (4) Date: Jul. 27, 2007

(87) PCT Pub. No.: WO2006/079583
PCT Pub. Date: Aug. 3, 2006

(65) Prior Publication Data
US 2008/0191690 A1 Aug. 14, 2008

(30) Foreign Application Priority Data
Jan. 27, 2005 (DE) .................. 10 2005 004 629

(51) Int. Cl.
*G01B 7/14* (2006.01)
*B60L 13/06* (2006.01)
(52) U.S. Cl. ............................ 324/207.26; 324/207.22; 104/284
(58) Field of Classification Search ............ 324/207.13, 324/207.22, 202, 207.26, 226, 260; 104/284; 340/540, 551, 552, 517, 521, 539.22
See application file for complete search history.

(56) References Cited

U.S. PATENT DOCUMENTS

| | | | |
|---|---|---|---|
| 3,638,093 A | 1/1972 | Ross | |
| 4,603,640 A * | 8/1986 | Miller et al. | ................. 104/282 |
| 4,641,586 A | 2/1987 | Miller et al. | |
| 5,764,050 A | 6/1998 | Ellmann et al. | |
| 6,499,701 B1 | 12/2002 | Thornton et al. | |
| 6,693,521 B2 | 2/2004 | Lorenz et al. | |
| 2002/0193937 A1 | 12/2002 | Lorenz et al. | |
| 2004/0027118 A1 * | 2/2004 | Lenz et al. | ............. 324/207.26 |

FOREIGN PATENT DOCUMENTS

| | | |
|---|---|---|
| DE | 32 44 420 A1 | 6/1984 |
| DE | 195 25 131 C2 | 1/1997 |
| DE | 101 21 786 A1 | 11/2002 |

* cited by examiner

*Primary Examiner*—Kenneth J Whittington
(74) *Attorney, Agent, or Firm*—Laurence A. Greenberg; Werner H. Stemer; Ralph E. Locher

(57) ABSTRACT

A distance sensor configuration for a magnet of the levitation magnet of a magnetic levitation transport system equipped with a number of distance sensors. Each distance sensor has a distance measuring coil acted upon by an operating frequency and can be placed in an installation space on the magnet. In order to obtain reliable distance measurement values by using a distance sensor configuration of the aforementioned type, the distance measuring coil of each distance sensor is connected to a programmable module for generating an operating frequency. The distance sensor contains a location information querying device for querying an installation space-specific location information providing device in the installation space. The location information querying device is connected on the input side to the programmable module.

17 Claims, 2 Drawing Sheets

DISTANCE SENSOR ARRANGEMENT FOR A MAGNET OF THE LEVITATION MAGNET OF A MAGNETIC LEVITATION TRANSPORT SYSTEM

BACKGROUND OF THE INVENTION

Field of the Invention

The invention relates to a distance sensor arrangement for a magnet for the levitation magnet of a magnetic levitation transport system having a plurality of distance sensors, in which each distance sensor has a distance measurement coil to which an operating frequency is applied, and can be fitted in an installation area on the magnet.

A distance sensor arrangement of this type is used for the Transrapid TR08 magnetic levitation transport system. As shown in FIG. 1, which schematically illustrates the drive system for this magnetic levitation transport system, a levitation magnet 1 which is firmly connected to the magnetic levitation transport system vehicle, which is not illustrated, has three magnets 2, 3 and 4, which are held underneath a linear stator 5, a section of which is illustrated, at a predetermined distance of about 10 mm during the movement of the magnetic levitation transport system vehicle relative to the linear stator 5. The distance between the levitation magnet 1 and the linear stator 5 is kept constant by a magnet control unit, which is not illustrated in FIG. 1 but to whose input side output variables from distance sensors are applied. As FIG. 1 shows, each of the magnets 2 to 4 of the levitation magnet 1 is in each case provided with a pair of distance sensors S1, S2 as well as S3, S4; S5, S6 and S7, S8 as well as S9, S10 and S11, S12. Each of these distance sensors S1 to S12 detects the distance between the magnets 2, 3 and 4 on the one hand and the linear stator 5 on the other hand, using the inductive measurement principle. Each of the distance sensors S1 to S12 therefore has a coil in the area of its surface, which coil cannot be seen in FIG. 1 but has a voltage at a specific frequency, for example of 1 MHz, applied to it. The impedance of each coil of the distance sensors S1 to S12 is dependent on the distance between the coil and the linear stator 5. Measurement of the impedance thus results in a measurement variable which corresponds to the distance between the respective distance sensor and the linear stator 5. The impedance measured variables are supplied to the magnet control unit and then, by appropriate excitation of the magnets 2 to 4, ensure that the levitation magnet 1 is kept at a constant distance from the linear stator 5 during motion.

As FIG. 1 also shows, in the known magnetic levitation transport system, two distance sensors are in each case arranged relatively close alongside one another, so that it is not possible to preclude the coil of one distance sensor being influenced by the field of the coil of the adjacent distance sensor. In order to preclude adverse effects of the measurement result of the individual distance sensor and thus adverse effects on the control of the distance between the levitation magnet 1 and the linear stator 5, the distance sensors or their coils are operated with voltages at different frequencies, with the separation between the frequencies being chosen to be sufficiently great that the frequencies of the beats that are created are relatively high and can therefore be separated without any problems from the useful signal, by means of a low-pass filter at the output of the distance sensor. In the case of the magnetic levitation transport system vehicle that has been mentioned, the distance sensors S1, S5 and S9 are therefore operated with a matching operating frequency; a corresponding situation applies to the distance sensors S2, S6 and S10, although the operating frequency that is applied to them is not the same as the operating frequency for the distance sensors S1, S5 and S9. The other distance sensors are operated in a corresponding manner. The geometric distance between two distance sensors using the same frequency therefore corresponds precisely to the length of a magnet 2, 3 and 4. This distance is sufficient to very largely preclude mutual interference between the distance sensors, since the field from the coils of the distance sensors decreases sharply as the distance increases.

It is evident from the above statements that, in the case of the known magnetic levitation transport system, the distance sensors represent four different appliances, which leads to considerable additional complexity and effort for manufacture, logistics and spares stock keeping. Furthermore, the different distance sensor types have the same or at least a similar appearance, so that it is necessary to place the distance sensors on the magnet of the levitation magnet with great care in order to achieve reliable operation.

SUMMARY OF THE INVENTION

The invention is based on the object of refining the distance sensor arrangement of the type mentioned initially such that it reliably produces correct distance measured values.

For a distance sensor arrangement of the type mentioned initially, this object is achieved according to the invention in that the distance measurement coil of each distance sensor is connected to a programmable module for operating frequency production, and each distance sensor contains a position information checking device for checking a position information provision device, which is individual to the installation area, in the installation area, and the position information checking device is connected on the input side to the programmable module.

One major advantage of the distance sensor arrangement according to the invention is that the use of sensors of a standard design and the incorporation of operating frequencies which are automatically adjusted individually avoids mutual interference between the distance sensors from the start, thus leading to reliable measured values.

A further major advantage of the distance sensor arrangement according to the invention is that each distance sensor in it is of identical design and can be placed without any problems in the installation area of the magnet, because its respective operating frequency is governed by the position information provision device and by the position information checking device, which interacts with it, after installation. Mutual interference between the distance sensors cannot occur, because the operating frequencies are set appropriately via the programmable module, via the position information checking device.

In the distance sensor arrangement according to the invention, the programmable module for generating the operating frequency may be designed in various ways. However, it is considered to be particularly advantageous for the programmable module to be an FPGA (Field Programmable Gate Array), because an integrated, programmable logic circuit such as this is physically small and costs little.

The distance sensor arrangement according to the invention may also be designed differently in terms of the configuration of the position information provision device and the position information checking device. With regard to a technically simple and thus financially advantageous solution, it is, however, regarded as being advantageous for the position information provision device to contain, in the installation of the magnet, a plurality of passive components in a spatial arrangement which is individual to the installation area, opposite which there are checking elements for the position information checking device when the distance sensor is in the installed state. Specifically, in this case, only passive components need be provided in the magnet, which do not require any power supply.

In one advantageously simple embodiment, of both the position information provision device and of the position information checking device, the checking elements are scanning coils, and the passive components are metallic or insulating reacting surfaces.

However, it is also possible and in some circumstances particularly advantageous for transmission reliability for the checking elements to be optical checking elements, and for the passive components to be reflectors.

A further advantageous refinement of the distance sensor arrangement is considered to be the checking elements being Reed contacts or Hall elements, and the passive components being permanent magnets.

In one embodiment of the distance sensor arrangement according to the invention that is regarded as being particularly simple, the checking elements are electrical contact elements, and the passive components are electrical contact parts.

This is because this refinement offers the advantageous capability to design the position information checking device to be particularly simple, if one electrical contact element is connected to one pole of an auxiliary voltage source, and at least one further electrical contact element is connected via a resistor to the other pole of the auxiliary voltage source and if the contact part which is opposite the first electrical contact element is electrically connected to the contact part which is opposite the further electrical contact element, and the at least one further electrical contact element is connected to the programmable module.

Since correct distance control is of major importance for reliable operation of a magnetic levitation transport system, and since the measured variable must therefore also be detected in a highly reliable form by the distance sensors, it is regarded as particularly advantageous for this purpose if, in the case of the distance sensor arrangement according to the invention, in the installation area for the magnet, the position information provision device has an additional position information provision device with a plurality of additional passive components in a matching spatial arrangement which is individual to the installation area, opposite which there are additional checking elements for an additional position information checking device when the distance sensor is in the installed state, and the position information checking devices are connected on the input side via a computation module to the programmable module.

In another advantageous embodiment of the distance sensor arrangement according to the invention, with particularly reliable detection of the distance, in the installation area for the magnet, the position information provision device has an associated additional position information provision device with a plurality of additional passive components in a matching spatial arrangement which is individual to the installation area, opposite which there are additional checking elements for an additional position information checking device when the distance sensor is in the installed state, and the position information checking devices are connected on the output side to a respective computation module, with the computation modules being connected to one another and each emitting an enable signal to the otherwise inhibited, programmable module.

It is likewise advantageous for reliable distance detectors by means of the distance sensor in the distance sensor arrangement according to the invention, if the position information provision device has an associated additional position information provision device in the installation area for the magnet, with a plurality of additional passive components in a matching spatial arrangement which is individual to the installation area, opposite which there are additional checking elements for an additional position information checking device when the distance sensor is in the installed state, and the position information checking devices are connected on the output side to a message generator for the distance sensor, in order to transmit the position information to a magnet control unit for the levitation magnet. In this embodiment, there is no need to separately evaluate the distance measurement in the distance sensor, because the distance measured value and the position information are passed directly to the magnet control unit for the levitation magnet.

In this context, an embodiment of the distance sensor arrangement according to the invention is likewise highly advantageous in which when there are in each case two pairs of distance sensors on one magnet, with in each case one pair being driven by one magnet control unit, the position information checking devices are connected to a message generator for the respective distance sensor, and the magnet control unit is designed such that the plausibility of the transmitted position information is checked in it.

Furthermore, it is regarded as advantageous if the installation area is located in a mounting strip which is fitted along the magnet, adjacent to projecting pole heads of the magnet.

If, additionally, the mounting strip is then provided at both of its ends with identification elements in a different arrangement or configuration, and the identification elements are connected at at least one end of the mounting strip to an identification circuit, this therefore further improves the reliability of the distance information emitted from the distance sensor arrangement according to the invention.

Furthermore, in order to obtain reliably correct distance measured values, it is advantageous if, in the case of a distance sensor for a magnet for the levitation magnet of a magnetic levitation transport system which has a distance measurement coil to which an operating frequency can be applied and which can be fitted in an installation area on the magnet, the distance sensor contains, according to the invention, a position information checking device for checking a position information provision device, which is individual to the installation area, in the installation area.

Checking elements for the distance sensor according to the invention may be designed differently, as can be seen from claims 16 to 20.

BRIEF DESCRIPTION OF THE SEVERAL VIEWS OF THE DRAWING

In order to explain the invention further, FIG. 2 schematically illustrates a side view of one half of a magnet for a levitation magnet.

DESCRIPTION OF THE INVENTION

Figure 1:
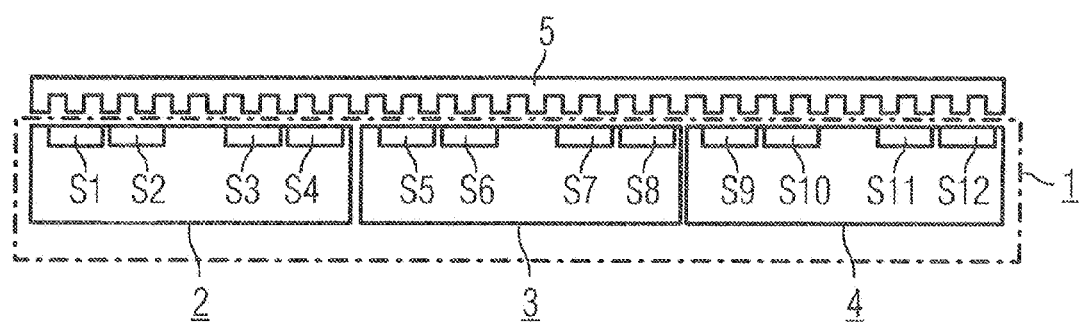
Figure 2:
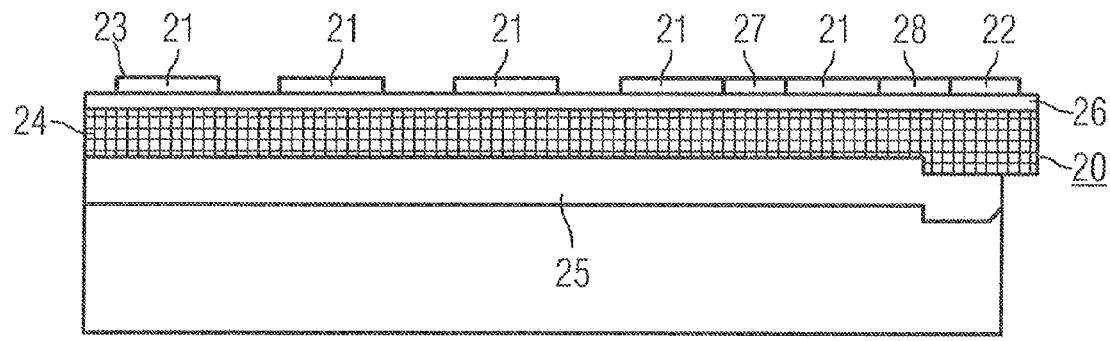

As can be seen from FIG. 2, a magnet 20 which, for example, may correspond to the magnet 2 shown in FIG. 1 is provided with a plurality of main poles 21 and one end pole 22. Each of the main poles 21 has a pole head 23 which merges in the downward direction, in a manner which is not illustrated, into a relatively narrow limb, on which magnet windings 24 are wound. A continuous magnetic return path 25 is located underneath the limbs of the main poles 21 and of the magnet windings 24.

A mounting strip 26, which may be composed of titanium, runs alongside the pole heads 23 on the magnet 20 at the top. This mounting strip 26 represents the installation area for distance sensors 27 and 28, whose physical arrangement in the example corresponds to that of the distance sensors S3 and S4 shown in FIG. 1.

Figure 3:
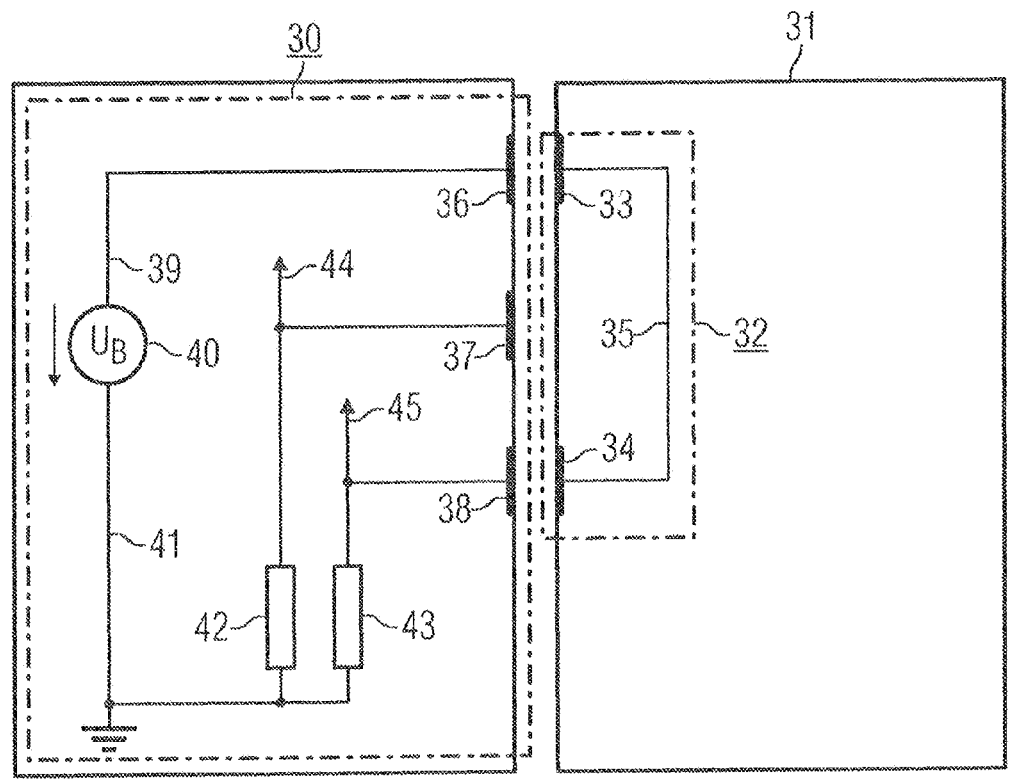
FIG. 3 shows one exemplary embodiment of a position information provision device and of a position information checking device.

Each of the distance sensors 27 and 28 is equipped with a position information checking device 30, as is shown in FIG. 3. The position information checking device 30 is located opposite a position information provision device 32 in the installation area 31 of the magnet 20.

The position information provision device 32 is designed on an installation-area individual basis in that it is accommodated with electrical contact parts 33 and 34 in an arrangement which is individually associated with the respective installation area; in the illustrated exemplary embodiment, only two electrical contact parts 33 and 34 are arranged a relatively long distance away from one another, and are connected to one another via an electrical connection 35.

The position information checking device 30 contains contact parts 36, 37 and 38 arranged such that the contact parts 36 and 38 are opposite the contact elements 33 and 34 in the position information provision device 32. One pole 39 of an operating voltage source 40 is connected to the contact part 36 in the position information checking device 30. The other pole 41 of the operating voltage source 40 is connected to ground on the one hand, and is electrically connected on the other hand via two resistors 42 and 43 to the contact parts 37 and 38. Each of the contact parts 37 and 38 is connected to a respective output 44 and 45 of the position information checking device 30. These outputs 44 and 45 are connected to a programmable module, which is not illustrated in FIG. 3, for generating the operating frequency. In the illustrated case, a bit signal "0" is produced at the output 44, and a bit signal "1" is produced at the output 45. The programmable module, which is not shown, thus produces a voltage at a specific operating frequency, which is applied to a distance measurement coil, which is likewise not illustrated, in the sensor.

As is self-evident, a distance sensor arrangement such as this makes it possible to apply voltage at a different operating frequency to a total of four distance sensors, since, in addition to the electrical contact elements 33 and 34, a further—not illustrated here—third, central, electrical contact element can also be provided for the installation area of other distance sensors.

This is completely adequate for practical operation of a magnetic levitation transport system with the levitation magnet being designed in the present way, since this makes it possible to ensure that the four distance sensors which are fitted to in each case one of the three magnets of a levitation magnet reliably have voltages at a different operating frequency applied to them.

Figure 4:
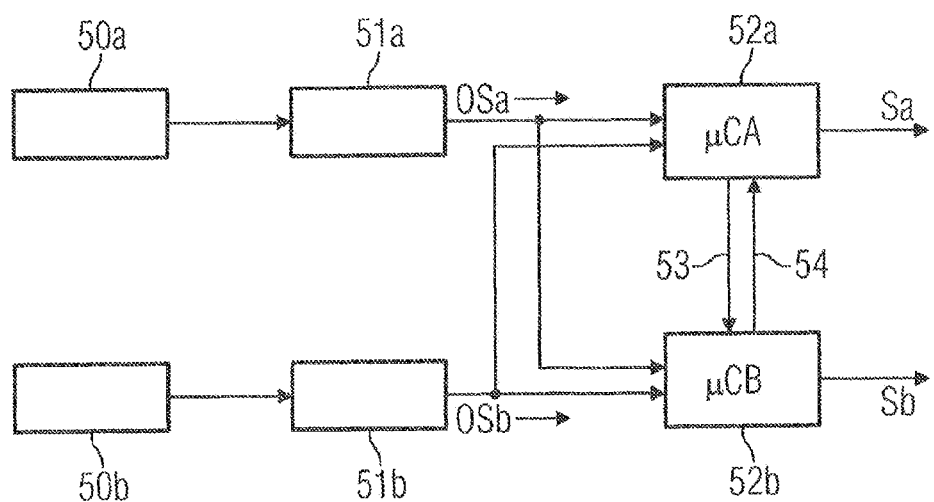
FIG. 4 shows an arrangement for evaluating the position information obtained by means of two position information provision devices which are associated with one distance sensor.

The reliability of the distance measurement can be further improved by duplicating the position information provision device and the position information checking device for each distance sensor, such that signals are then in each case emitted in pairs from the position information checking devices. As can be seen from FIG. 4, a distance sensor, which is not illustrated here, has a first associated position information provision device 50a and, so to speak in parallel with it, a further position information provision device 50b; both position information provision devices 50a and 50b may each be designed in the form of the device 32 as shown in FIG. 3. Position information signals OSa and OSb, which are both supplied jointly to a respective microcontroller 52a and 52b, are produced by means of a respective position information checking device 51a or 51b, for example corresponding to the position information checking device 30 shown in FIG. 3. These microcontrollers 52a and 52b compare their result via channels 53 and 54 with one another, and emit a respective signal Sa and Sb to the programmable modules, which are not illustrated here, once they have determined correct position information. The programmable module produces a voltage of the operating frequency that has been allocated to the respective distance sensor only when both signals, Sa and Sb are present at the programmable module.

However, it is also possible to improve the reliability of the distance sensor arrangement according to the invention by also transmitting information about the operating frequency of the distance measurement coil, as information about the respectively measured distance, in addition to the message, which is normally produced by the distance sensor, for information of a magnet control unit. If the position information has been obtained by means of two position information provision devices and two position information checking devices, then the magnet control unit checks that the information items are identical. There is then no need for special microcontroller for the comparision relating to the embodiment shown in FIG. 4.

On the other hand, it is also possible to check the correct installation of a distance sensor and the operation of the position information provision devise and of its position information checking device by checking the corresponding position information from two adjacent distance sensors in the magnet control unit, because one magnet control unit always controls either the sensors S1, S2, or S3, S4 (see FIG. 1), and it is therefore able to detect a specific combination of position information items from the two pairs, and to check that they are correct.

The invention claimed is:

1. A distance sensor configuration for a magnet of a levitation magnet in a magnetic levitation transport system, comprising:
    a plurality of distance sensors each including a distance measurement coil subject to an operating frequency and being configured for mounting in an installation space at the magnet;
    said distance measurement coil of each said distance sensor being connected to a programmable module for generating the operating frequency;
    each said distance sensor containing a position information checking device for checking a position information provision device in the installation space, the position information provision device being individual to the installation space;

said position information checking device having an input side connected to said programmable module; and said position information provision device contains a plurality of passive components in a spatial configuration that is individual to the installation space, in the installation space, opposite which there are checking elements for the position information checking device when the distance sensor is in the installed state.

2. The distance sensor configuration according to claim 1, wherein said programmable module is an FPGA (Field Programmable Gate Array).

3. The distance sensor configuration according to claim 1, wherein said checking elements are scanning coils, and said passive components are metallic or insulating reacting surfaces.

4. The distance sensor configuration according to claim 1, wherein said checking elements are optical checking elements, and said passive components are reflectors.

5. The distance sensor configuration according to claim 1, wherein said checking elements are Reed contacts or Hall elements, and said passive components are permanent magnets.

6. The distance sensor configuration according to claim 1, wherein said checking elements are electrical contact elements, and said passive components are electrical contact parts.

7. The distance sensor configuration according to claim 6, wherein
one of said electrical contact elements is connected to one pole of an auxiliary voltage source, and at least one further electrical contact element is connected through a resistor to an opposite pole of the auxiliary voltage source;
said contact part opposite a first electrical contact element is electrically connected to said contact part opposite a further electrical contact element; and
at least one further electrical contact element is connected to said programmable module.

8. The distance sensor configuration according to claim 1, wherein said installation space is formed in a mounting strip fitted along the magnet, adjacent to projecting pole heads of the magnet.

9. The distance sensor configuration according to claim 8, wherein:
the mounting strip has two ends each carrying an identification element in a different arrangement or configuration; and
said identification elements are connected at at least one end of the mounting strip to an identification circuit.

10. A distance sensor configuration for a magnet of a levitation magnet in a magnetic levitation transport system, comprising:
a plurality of distance sensors each including a distance measurement coil subject to an operating frequency and being configured for mounting in an installation space at the magnet,
said distance measurement coil of each said distance sensor being connected to a programmable module for generating the operating frequency;
each said distance sensor containing a position information checking device for checking a position information provision device in the installation space, the position information provision device being individual to the installation space;
said position information checking device having an input side connected to said programmable module;
said position information provision device having an additional position information provision device in said installation space for the magnet, with a plurality of additional passive components in a matching spatial arrangement that is individual to the installation space, opposite which there are additional checking elements for an additional position information checking device when the distance sensor is in the installed state; and
said position information checking devices being connected on the input side via a computation module to said programmable module.

11. A distance sensor configuration for a magnet of a levitation magnet in a magnetic levitation transport system, comprising
a plurality of distance sensors each including a distance measurement coil subject to an operating frequency and being configured for mounting in an installation space at the magnet;
said distance measurement coil of each said distance sensor being connected to a programmable module for generating the operating frequency;
each said distance sensor containing a position information checking device for checking a position information provision device in the installation space, the position information provision device being individual to the installation space;
said position information checking device having an input side connected to said programmable module;
said position information provision device having an associated additional position information provision device in said installation space for the magnet, with a plurality of additional passive components in a matching spatial arrangement that is individual to the installation space, and additional checking elements opposite therefrom for an additional position information checking device when the distance sensor is in the installed state; and
said position information checking devices being connected on an output side to a respective computation module, and the computation modules are connected to one another and each emit an enable signal to the otherwise inhibited, programmable module.

12. A distance sensor configuration for a magnet of a levitation magnet in a magnetic levitation transport system, comprising
a plurality of distance sensors each including a distance measurement coil subject to an operating frequency and being configured for mounting in an installation space at the magnet;
said distance measurement coil of each said distance sensor being connected to a programmable module for generating the operating frequency;
each said distance sensor containing a position information checking device for checking a position information provision device in the installation space, the position information provision device being individual to the installation space;
said position information checking device having an input side connected to said programmable module;
said position information provision device having an associated additional position information provision device in the installation space for the magnet, with a plurality of additional passive components in a matching spatial arrangement that is individual to the installation space, and
additional checking elements opposite therefrom for an additional position information checking device when the distance sensor is in the installed state; and said position information checking devices being connected on the output side to a message generator for the distance sensor, in order to transmit the position information to a magnet control unit for the levitation magnet.

13. A distance sensor configuration for a magnet of a levitation magnet in a magnetic levitation transport system, comprising
    a plurality of distance sensors each including a distance measurement coil subject to an operating frequency and being configured for mounting in an installation space at the magnet;
    said distance measurement coil of each said distance sensor being connected to a programmable module for generating the operating frequency;
    each said distance sensor containing a position information checking device for checking a position information provision device in the installation space, the position information provision device being individual to the installation space;
    said position information checking device having an input side connected to said programmable module;
    when there are in each case two pairs of distance sensors on one magnet, with in each case one pair being driven by one magnet control unit, the position information checking devices are connected to a message generator for the respective distance sensor; and
    the magnet control unit is configured for checking therein a plausibility of the transmitted position information.

14. A distance sensor for a magnet of a levitation magnet in a magnetic levitation transport system, which comprises:
    a distance measurement coil to which an operating frequency is applied;
    the distance sensor being configured for fitting in an installation space at the magnet;
    a position information checking device for checking a position information provision device, which is individual to the installation space, in the installation space; and
    said position information checking device including scanning coils forming checking elements.

15. A distance sensor for a magnet of a levitation magnet in a magnetic levitation transport system, which comprises:
    a distance measurement coil to which an operating frequency is applied;
    the distance sensor being configured for fitting in an installation space at the magnet;
    a position information checking device for checking a position information provision device, which is individual to the installation space, in the installation space; and
    said position information checking device including optical checking.

16. A distance sensor for a magnet of a levitation magnet in a magnetic levitation transport system, which comprises:
    a distance measurement coil to which an operating frequency is applied;
    the distance sensor being configured for fitting in an installation space at the magnet;
    a position information checking device for checking a position information provision device, which is individual to the installation space, in the installation space; and
    said position information checking device including Reed contacts forming checking elements.

17. A distance sensor for a magnet of a levitation magnet in a magnetic levitation transport system, which comprises:
    a distance measurement coil to which an operating frequency is applied;
    the distance sensor being configured for fitting in an installation space at the magnet;
    a position information checking device for checking a position information provision device, which is individual to the installation space, in the installation space;
    said position information checking device including electrical contact elements; and
    an electrical contact element is connected to one pole of an auxiliary voltage source, and at least one further electrical contact element is connected through a resistor to an opposite pole of the auxiliary voltage source.

* * * * *